United States Patent
Uematsu et al.

(10) Patent No.: US 6,189,892 B1
(45) Date of Patent: Feb. 20, 2001

(54) HIGH DIFFERENTIAL PRESSURE TYPE END ROTOR SEAL

(75) Inventors: Kazuo Uematsu; Rintaro Chikami; Kazuharu Hirokawa, all of Takasago (JP)

(73) Assignee: Mitsubishi Heavy Industries, Ltd., Tokyo (JP)

( * ) Notice: Under 35 U.S.C. 154(b), the term of this patent shall be extended for 0 days.

(21) Appl. No.: 09/214,384

(22) PCT Filed: Apr. 21, 1998

(86) PCT No.: PCT/JP98/01822

§ 371 Date: Dec. 30, 1998

§ 102(e) Date: Dec. 30, 1998

(87) PCT Pub. No.: WO98/49426

PCT Pub. Date: May 11, 1998

(30) Foreign Application Priority Data

Apr. 30, 1997 (JP) .................................................. 9-112326
May 12, 1997 (JP) .................................................. 9-120736

(51) Int. Cl.⁷ .................................................. F16J 15/447
(52) U.S. Cl. .................................................. 277/418; 277/419
(58) Field of Search .................................. 277/373, 412, 277/418, 419

(56) References Cited

U.S. PATENT DOCUMENTS

| | | | |
|---|---|---|---|
| 792,131 | * 6/1905 | Hodgkinson | 277/412 |
| 897,189 | * 8/1908 | Belluzzo | 277/412 |
| 1,187,212 | * 6/1916 | Westinghouse | 277/412 |
| 1,626,237 | * 4/1927 | Hodgkinson | 277/412 |
| 2,245,281 | * 6/1941 | Klopak | 277/412 |
| 4,290,610 | * 9/1981 | Lizogub et al. | 277/412 |
| 4,429,883 | * 2/1984 | Nakanishi | 277/412 |
| 4,586,717 | * 5/1986 | Sweeny | 277/412 |
| 5,029,876 | 7/1991 | Orlando et al. | 277/56 |
| 5,344,166 | 9/1994 | Scarlata et al. | 277/3 |

FOREIGN PATENT DOCUMENTS

| | | |
|---|---|---|
| 36-3216 | 2/1961 | (JP) . |
| 52-151206 | 11/1977 | (JP) . |
| 63-111363 | 9/1978 | (JP) . |
| 54-15985 | 6/1979 | (JP) . |
| 2-245581 | 10/1990 | (JP) . |
| 5-332456 | 12/1993 | (JP) . |
| 9-112708 | 5/1997 | (JP) . |

OTHER PUBLICATIONS

"Lecture 3 by Thermal and Nuclear Power Engineering Society Turbin Generator (in Japanese)", edited by The Society of Thermal and Nuclear Pwer, Aug. 1995, pp. 97–98, "2.7 Labyrinth Packing".

"Handbook of Thermal and Nuclear Power Generation (in Japanese)", supervised by Ministry of International trade and Industry, Agency of Natural Resources and Energy, revised edition, 5th edition, 3rd print, edited by The Society of Thermal and Nuclear Power (Tokyo), Mar. 15, 1996, pp. 286–287, "14–27 Clearances between Turbin Components and Example of Alignment".

"Machine Design Handbook", edited by Editorial Committee on Machine Design Handbook, 1st edition, 4th printing, Kyoritsu Shuppan (K.K.), p. 6–151 to p. 153, "6.403 Labyrinth Packing".

* cited by examiner

Primary Examiner—Anthony Knight
Assistant Examiner—Alison K. Pickard
(74) Attorney, Agent, or Firm—Wenderoth, Lind & Ponack, L.L.P.

(57) ABSTRACT

A high differential pressure type end rotor seal that is applicable to a steam cooled type gas turbine with the aim to reduce steam leakage to a minimum without being affected by deviation of fins due to thermal elongation. An end rotor rotational seal of a double strip seal type is structured such that fins (3,5) on a stator side (1) and fins (4,6) on a rotor side (2) are arranged in a confronting arrangement and an alternating arrangement. A fin-to-fin pitch (P) is set in a range of 2 to 6 mm and a clearance (C) between apexes of the fins is set in a range of 0.3 to 1.0 mm, thereby a high differential pressure type rotational seal is obtained having minimum steam leakage without being affected by deviation of fins due to thermal elongation between the stator side and the rotor side.

6 Claims, 8 Drawing Sheets

HIGH DIFFERENTIAL PRESSURE TYPE END ROTOR SEAL

BACKGROUND OF THE INVENTION

1. Field of the Invention

The present invention relates to a rotational seal device applicable mainly as a gas turbine end rotor seal having a structure that provides an enhanced sealing performance and facilitates assembly or replacement of the seal portion.

2. Description of the Prior Art

FIG. 8 is a cross sectional side view showing one example of a seal structure of a gas turbine rotor end portion which has been developed by the inventors for use together with a steam cooled system of the rotor. In FIG. 8, numeral 11 designates a rotor comprising an inner rotor 11a and an outer rotor 11b. A cooling medium, or steam 20, is supplied between the inner rotor 11a and the outer rotor 11b via a steam inlet 14. The steam, after having cooled the rotor, passes through the inner rotor 11a and flows out of a steam outlet 15 to be recovered. Numeral 16 designates a bearing portion and a labyrinth seal 13 is provided between the outer rotor 11b and a stator 12 for sealing to prevent the steam from leaking outside.

In the above-mentioned end rotor seal, because the end rotor overhangs beyond the bearing portion 16 as shown in FIG. 8, there is a limitation in a rotor axial directional length of the seal portion by which the seal portion cannot be further elongated. Also, because there is a large difference in the thermal elongation between the rotor side and the stator side, there is also a limitation in the length from this point of view. Due to these limitations, if a steam cooled system is to be used for the rotor, the seal length is limited to about 270 mm at most and if a labyrinth seal is employed therefor, the number of stages (number of fins) is limited to about ten (10).

FIGS. 7(a)–7(b) are an explanatory views showing examples of prior art seal structures applied for the end rotor seal described above, wherein FIG. 7(a) is a double strip seal and FIG. 7(b) is a labyrinth seal. In the double strip seal of FIG. 7(a), there are provided fins 32 on the stator side 31 and fins 34 on the rotor side 33, disposed such that the fins 32 are opposed to the fins 34 with a predetermined clearance C in a rotor radial direction being maintained therebetween and also with a fin to fin pitch P in a rotor axial direction with respect to the fins 32 and the fins 34, respectively. If the double strip seal is used for the end rotor seal of a gas turbine, the length L thereof is about 270 mm as mentioned above and when the pitch P=3 mm, the number of fins is 90, when P=6 mm, the number of fins is 45 and when P=10 mm, the number of fins is 27.

In the labyrinth seal of FIG. 7(b), there are provided fins 42, projection portions 43 and fins 44 on the projection portion 43 on the stator side 41 and projection portions 46 on the rotor side 45, disposed such that the fins 42 are opposed to the projection portions 46 with a predetermined clearance C' in the rotor radial direction being maintained therebetween. If this labyrinth seal is used for the end rotor seal of a gas turbine, because there occurs a thermal elongation of about ±20 mm in the rotor axial direction, the number of the fins is limited to about ten (10) due to the arrangement of the fins 44 and the projection portions 46.

FIG. 6 is a detailed cross sectional view showing one example of the end rotor seal portion shown in FIG. 8.

In FIG. 6, the interior of the rotor 11 is made in a double structure, wherein numeral 53 designates an outer cooling passage and numeral 54 designates a central cooling passage. A cooling medium, shown by arrow 20a, which is for example a cooling air or the steam 20, as shown in FIG. 8, is led into the outer cooling passage 53 for cooling of the rotor 11 and, after having been used for the cooling, flows in the central cooling passage 54, as shown by arrow 20b, to flow outside of the rotor 11. There are provided a multiplicity of the fins 34 in the rotor axial direction on a rotor outer circumferential surface so as to form a seal portion of the rotor side.

As a seal portion of the stator side, there are provided a multiplicity of the fins 32 in the rotor axial direction, like the fins 34 on the rotor 11, and the fins 32 are disposed close to the fins 34 in an opposing relationship along a rotor circumferential direction. Thus, a double strip seal is formed by the fins 34 on the rotor side and the fins 32 on the stator side.

The fins 34 on the rotor side, as described above, are formed by cutting the outer circumferential surface of the rotor 11, or are buried fixedly therein if the pitch between the fins is comparatively large, so that the rotor 11 and the fins 34 are made integrally in one unit.

In the present state gas turbine, a large amount of cooling air is introduced in the rotor and the blade continuously and thus, a considerable amount of power is consumed for a compressor or a cooler thereof for producing high pressure air therefor, which is an obstacle in enhancing the gas turbine performance. Also, in the recent combined cycle power plant having an enhanced power generation efficiency due to the use of the combination of a gas turbine and a steam turbine, trials are being conducted so that, in place of using air for cooling the rotor or the blade, a portion of steam from the steam turbine is extracted and led into the rotor or the blade for cooling thereof, but this steam cooled system is still being developed.

The seal structure of the prior art gas turbine rotor is formed in one unit of the rotor and the fins as mentioned above, and in case the fins of the rotor have worn out after long hours of use, it is necessary to change the entire rotor along with the fins. Even if only the fins have worn out and there is nothing unusual in the rotor itself, the rotor must be changed, which is very economically inefficient. Also, in the case where the seal is formed by the fins being buried one by one, a long period of time is required in order to perform the difficult task of replacing the fins.

SUMMARY OF THE INVENTION

Thus, it is an object of the present invention, in the case of a steam cooled system for a gas turbine rotor or blade, to provide a high differential pressure type end rotor seal which is applicable as an end rotor rotational seal and in which a fin-to-fin pitch in a rotor axial direction and a clearance in a rotor radial direction between fins have been designed optimally as the result of repeated experiments carried out so as to reduce leakage of cooling medium to a minimum in consideration of the influence of a thermal elongation.

Also, it is an object of the present invention to provide a high differential pressure type end rotor seal, in addition to that having the minimum leakage as mentioned above, in which a fin portion of the rotor is made and assembled separately from the rotor and is then fitted to the rotor so that, when only the fins have worn out, it is not necessary to replace the entire rotor but only the fin portion can be changed.

In order to achieve said object, the present invention provides the following means:

(1) A high differential pressure type end rotor seal, applicable as a seal for a rotor end portion of a turbine, made as a double strip seal type having fins spaced with a predetermined fin-to-fin pitch in a rotor axial direction on a rotor side and a stator side, respectively. The fins on the rotor side and those on the stator side are disposed so as to be opposed to each other with a predetermined clearance in a rotor radial direction maintained between apexes of the respective fins. The seal is characterized in that the fin-to-fin pitch is set in a range of 2 to 6 mm and the clearance is set in a range of 0.3 to 1.0 mm.

(2) A high differential pressure type end rotor seal as mentioned in (1) above, characterized in that the fins on the rotor side are provided on a sleeve and the sleeve is detachably fitted around the rotor end portion.

(3) A high differential pressure type end rotor seal as mentioned in (2) above, characterized in that the sleeve is fitted around the rotor end portion via a rotation prevention key.

According to the invention of (1) above, the fins of the double strip seal are arranged such that the fin-to-fin pitch in the rotor axial direction on the rotor side and the stator side, respectively, is set in a range of 2 to 6 mm and the clearance in the rotor radial direction between the apexes of the respective fins on the rotor side and the stator side is set in a range of 0.3 to 1.0 mm, thereby even when the seal is used as a rotational seal for a high differential pressure of several tens $kg/cm^2$ at a steam cooled type rotor end, it has been confirmed with test results that the steam leakage can be lessened without being affected by deviation of fins due to the thermal elongation.

According to the inventions of (2) and (3) above, the end rotor seal is made such that the sleeve is fitted around the rotor detachably and the fins are provided on the sleeve. Thereby even when the fins have worn out, the sleeve can be removed in order to be changed with a new finned sleeve. In the prior art, the rotor and the fins have been made integrally, and if the fins wear out, even though nothing is wrong with the rotor and it is still usable, the rotor must be changed along with the fins thereby creating an economically inefficient situation. In the present invention, however, there is no need to change the rotor together with the fins, and thus, elongation of the rotor life can be achieved.

Further, in addition to the enhancement of the sealing performance of the end rotor seal, because the sleeve and the fins are made and assembled separately from the rotor, work time in all aspects of making, assembling, maintenance, etc. can be shortened and economical advantage can be enhanced.

BRIEF DESCRIPTION OF THE DRAWINGS

FIGS. 1(a)–1(c) are explanatory views showing an arrangement of fins of gas turbine end rotor seals of embodiments according to the present invention, wherein FIG. 1(a) is a double strip seal having confronting type fins, FIG. 1(b) is a double strip seal having alternating type fins, and FIG. 1(c) shows a fin shape.

FIGS. 4(a)–4(b) are explanatory views of a seal device in which the end rotor seals of the embodiments of FIG. 1 are easily formed, wherein FIG. 4(a) is a cross sectional side view and FIG. 4(b) is a front view.

FIGS. 5(a)–5(b) are explanatory views of the seal device of FIG. 4(a), wherein FIG. 5(a) is a side view of a rotor, and FIG. 5(b) is a cross sectional side view of a seal assembly.

FIGS. 7(a)–7(b) are explanatory views showing examples of prior art seal structures, wherein FIG. 7(a) is a double strip seal, and FIG. 7(b) is a labyrinth seal.

DETAILED DESCRIPTION OF THE PREFERRED EMBODIMENTS

Figure 1A:
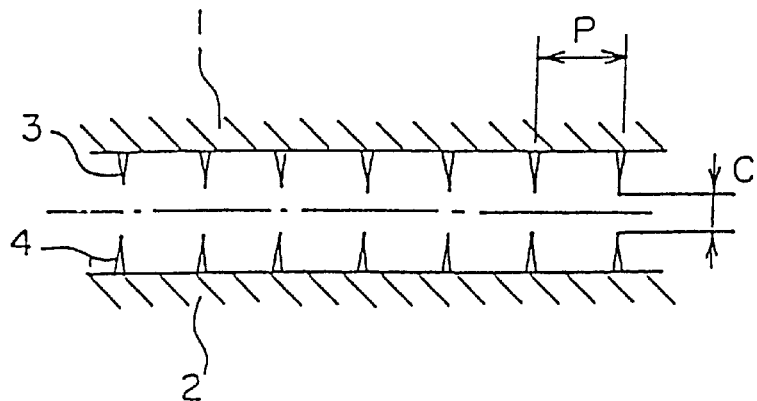
Figure 1B:
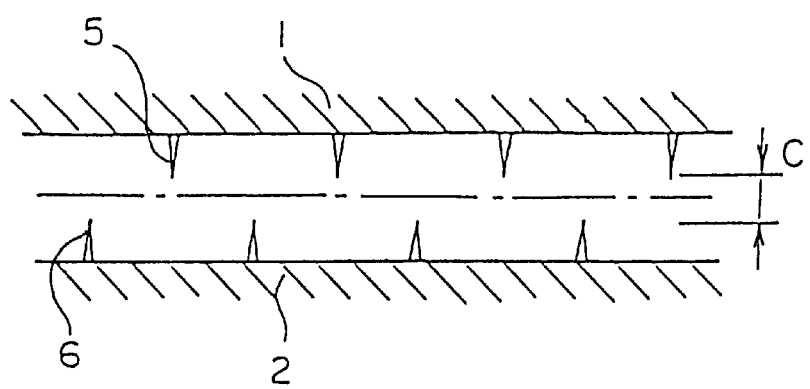
Figure 1C:
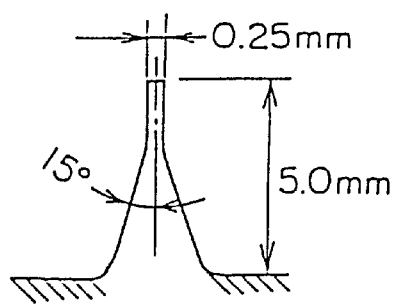

Herebelow, embodiments according to the present invention will be described with reference to the drawing figures. FIGS. 1(a)–1(b) are explanatory views showing an arrangement of fins of gas turbine end rotor seals of embodiments according to the present invention, wherein FIG. 1(a) is a double strip seal having a seal structure in which fins 3 and 4 on a stator side 1 and on a rotor side 2, respectively, are arranged so as to confront each other, FIG. 1(b) is a double strip seal having a seal structure in which fins 5 and 6 on the stator side 1 and on the rotor side 2, respectively, are arranged so as to alternate with each other, and FIG. 1(c) shows a particular fin shape.

With respect to the double strip seals, respective sealing abilities have been tested where a clearance C in a rotor radial direction between the mutually confronting or alternating fins is set to C=0.5 mm on each case where a fin-to-fin pitch in a rotor axial direction is set to P=3 mm (number of fins is 90)

P=6 mm (number of fins is 45) and

P=10 mm (number of fins is 27), and in a case of a labyrinth seal (number of fins is 10).

Figure 2:
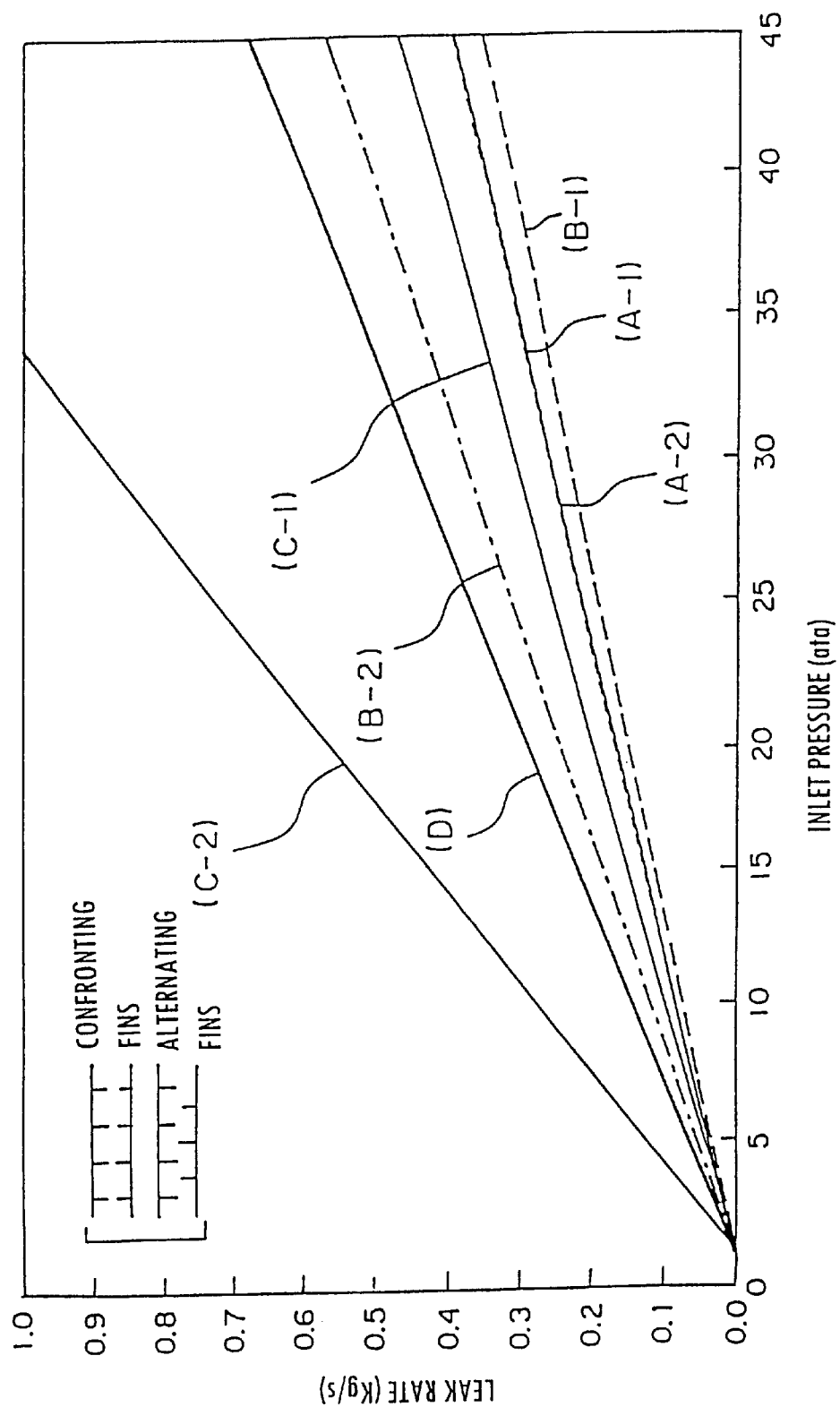
FIG. 2 shows test results of leak rate relative to inlet pressure obtained by the double strip seals of FIG. 1.

FIG. 2 shows the results of each of the above tests wherein a leak rate (kg/s) relative to an inlet pressure (ata) has been measured. In FIG. 2, results of the following cases are shown, that is;

(A-1) Confronting fins, P=3 mm (A-2) Alternating fins, P=3 mm (B-1) Confronting fins, P=6 mm (B-2) Alternating fins, P=6 mm (C-1) Confronting fins, P=10 mm (C-2) Alternating fins, P=10 mm (D) Labyrinth seal.

The results thereof shows that the least leak rate is attained by the case B-1 where the fins are confronting and P=6 mm.

Figure 3:
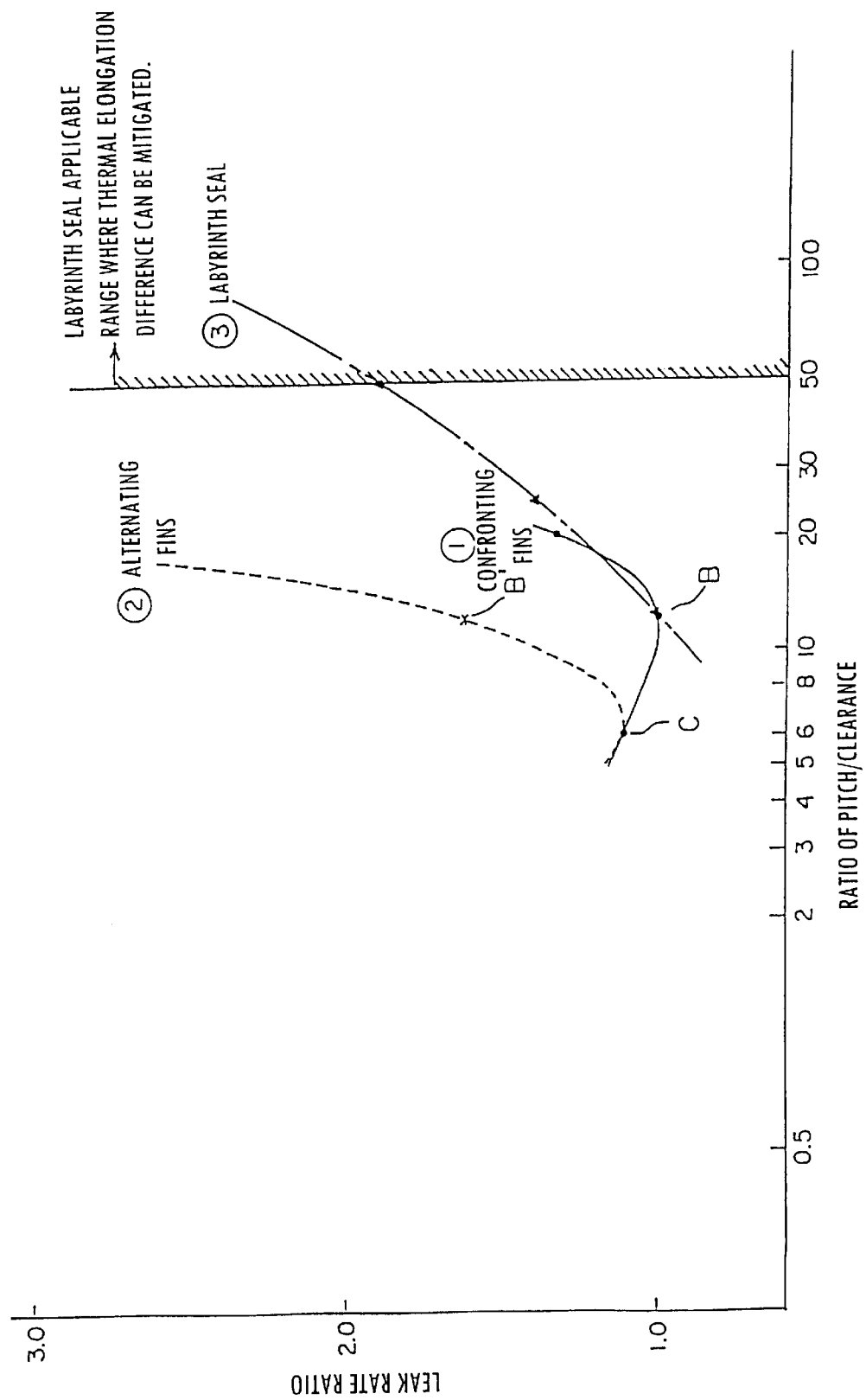
FIG. 3 shows leak rate characteristics of the double strip seals of FIG. 1.

In the above results of FIG. 2, when P=6 mm, the least leak rate is attained by the confronting fins. FIG. 3 shows the relationship between a leak rate ratio and a ratio of pitch/clearance with respect to the double strip seals of the confronting fins and the alternating fins.

FIG. 3, 1̂ shows the case of confronting fins and P=6 mm, 2̂ shows the case where the confronting fins of 1̂ have changed to the alternating fins due to thermal elongation and 3̂ shows the case of a labyrinth seal. As shown in FIG. 3, the least leak rate ratio is attained at a ratio of the pitch/clearance at point B but this point B moves to point B' with an increase of the leak rate as the fins change to the alternating state from the confronting state with the rotor axial directional thermal elongation.

On the other hand, at point C where the pitch/clearance ratio is six (6), that is, for example, when the pitch P=3 mm, and the clearance C=0.5 mm, there is less influence of the thermal elongation than at the point B and less leak rate than at the point B', hence employment of the point C is considered better than employing the point B or B'.

In order to obtain the leak rate at the point C, it is necessary to set the value of the pitch/clearance ratio to 6 and the setting may be made such that when the pitch P=2 mm, the clearance C=0.3 mm, when P=3 mm, C=0.5 mm and when P=6 mm, C=1.0 mm. Thus, from these values, in order to lessen the leak rate at the end rotor seal, the pitch P may be set to a range of 2 to 6 mm and the clearance C to a range of 0.3 to 1.0 mm corresponding thereto. By employing the double strip seal in which the fins are selected to be in the above ranges, even considering the influence of deviation of the fins due to the thermal elongation between the rotor side and the stator side in the rotational seal of a high differential pressure of several tens kg/cm$^2$, leakage of the steam can be reduced to a minimum without receiving the influence and stable sealing can be obtained.

It is to be noted that, in the present embodiment, the high differential pressure type end rotor seal of the present invention has been described with respect to the example of the gas turbine but the invention is not limited thereto but may also be employed as a seal in a steam turbine with the same effect.

Figure 4A:
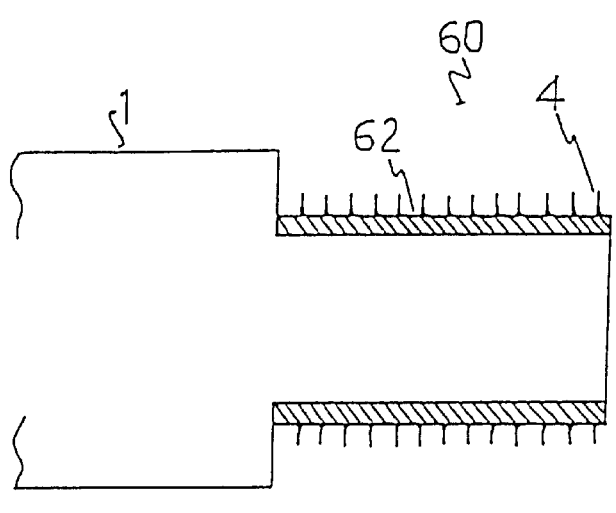
Figure 4B:
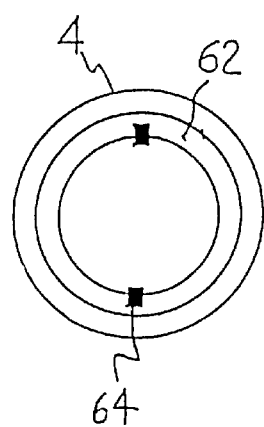

FIGS. 4(a)–4(b) are explanatory views of a seal device structured such that the described end rotor seal is easily formed, wherein FIG. 4(a) is a cross sectional side view and FIG. 4(b) is a front view. In FIG. 4, numeral 1 designates a rotor and only an external form thereof is illustrated with internal structure thereof being omitted. Numeral 62 designates a sleeve, which is fitted around an outer circumferential surface of the rotor 1. Numeral 4 designates fins, which are cut in an outer circumferential surface of the sleeve 62 or buried therein. Numeral 64 designates a rotation prevention key, which is provided so as to be buried in the sleeve 62 and the rotor 1 for preventing the sleeve 62 from rotating relative to the rotor 1. Numeral 60 designates a seal assembly formed by these parts.

Figure 5A:
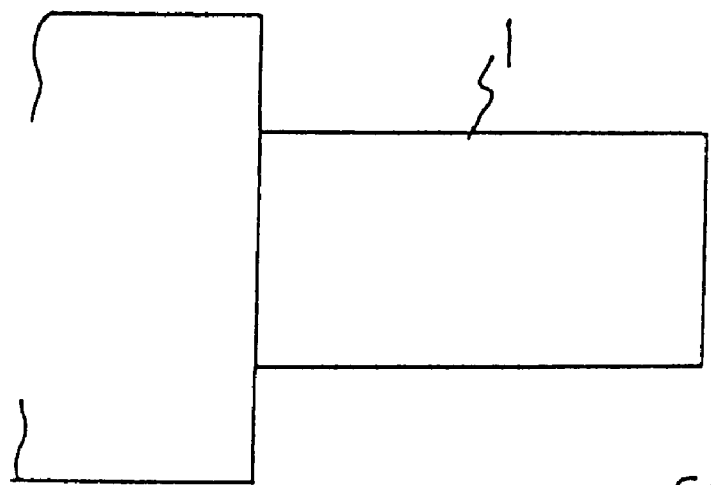
Figure 5B:
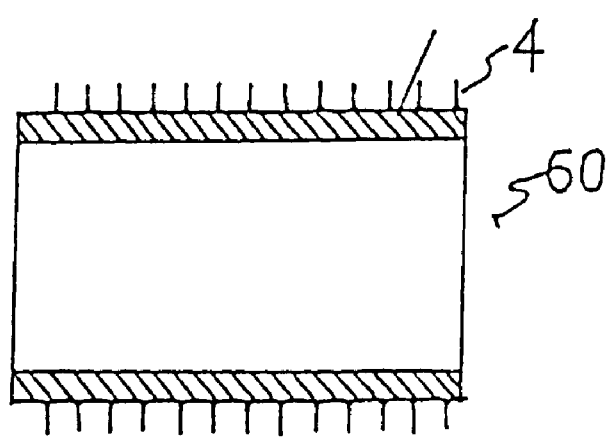
Figure 6:
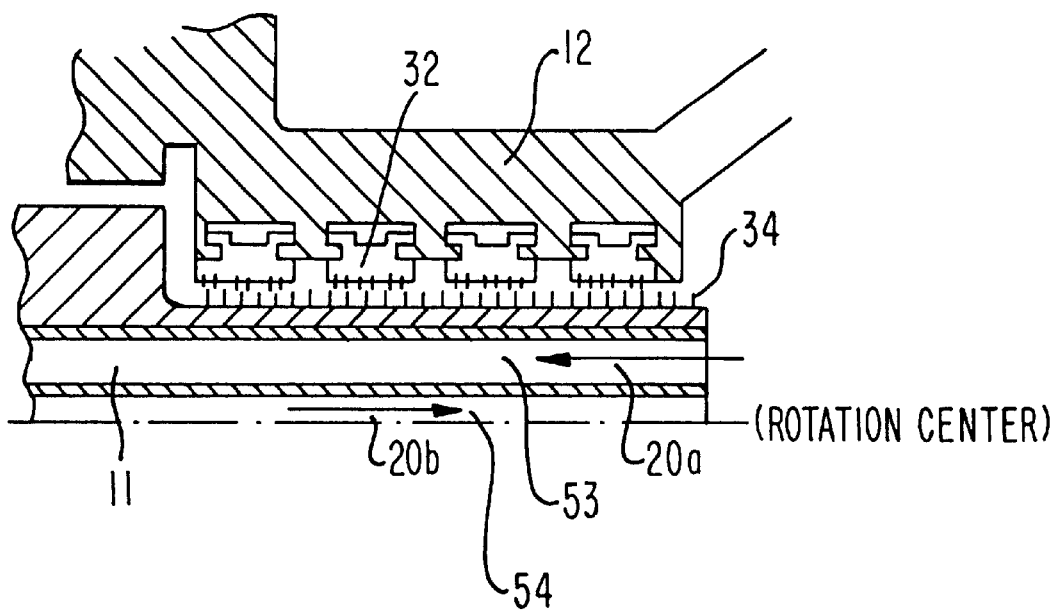
FIG. 6 is a detailed cross sectional view showing one example of the end rotor seal portion of FIG. 8.
Figure 7A:
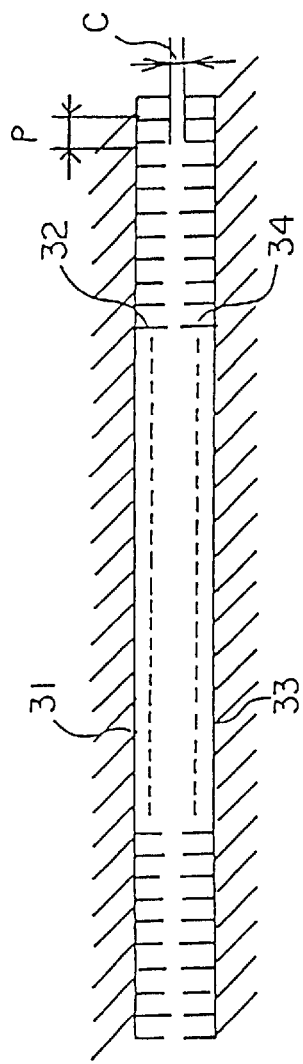
Figure 7B:
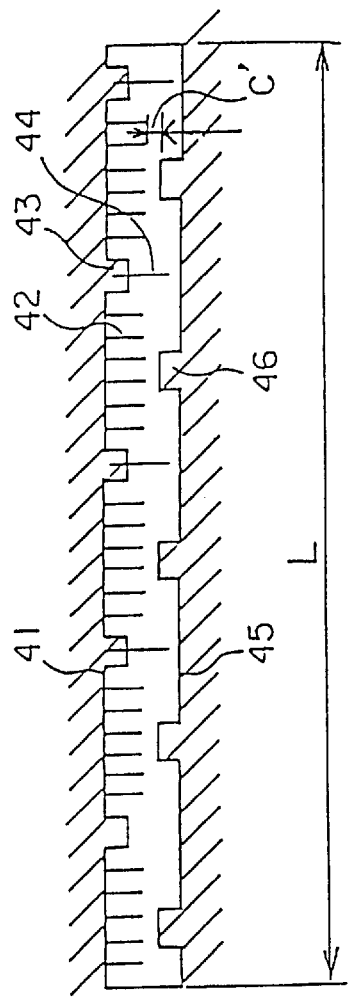
Figure 8:
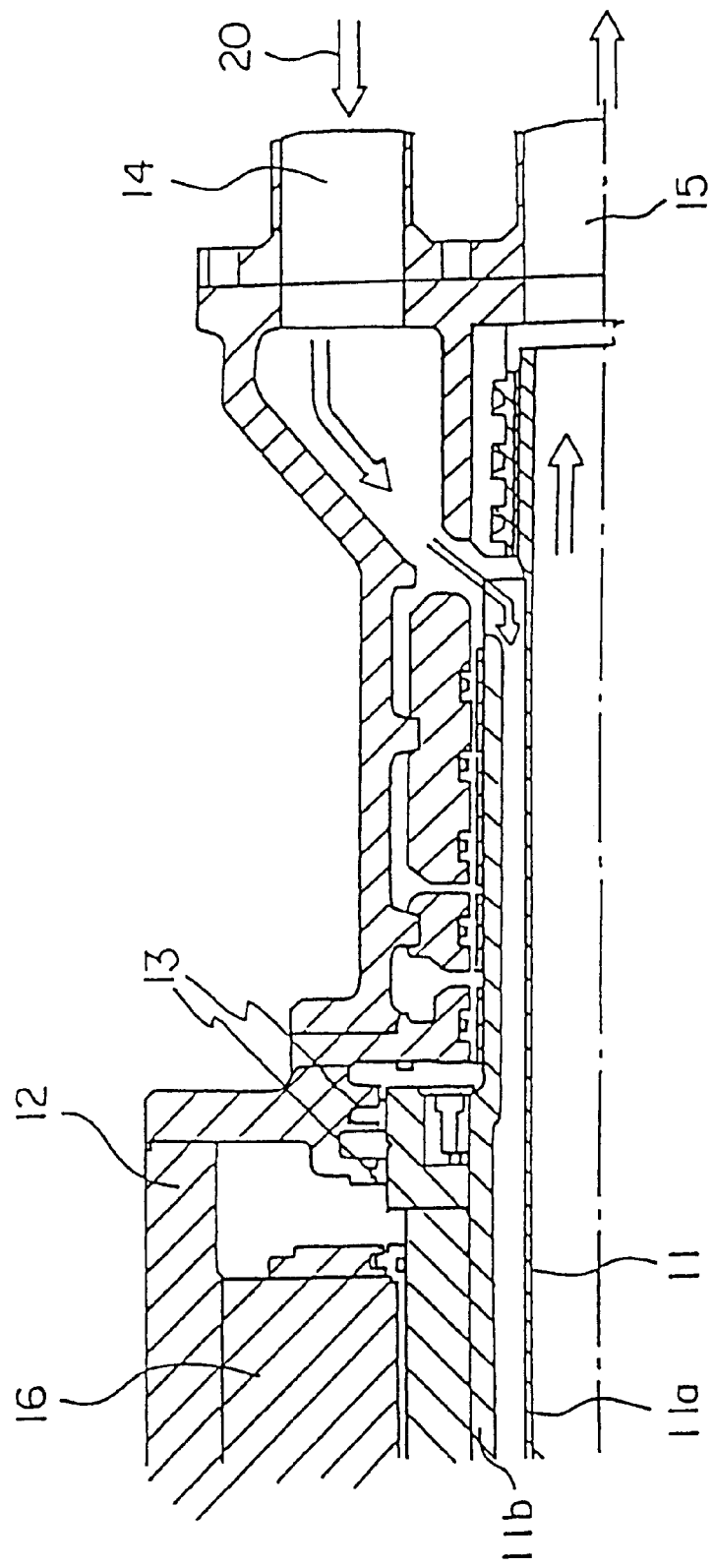
FIG. 8 is a cross sectional side view showing one example of a prior art seal structure for a gas turbine rotor end portion.

FIGS. 5(a)–5(b) are explanatory views showing the rotor 1 and the seal assembly 60, respectively, wherein FIG. 5(a) is a side view of the rotor 1, and FIG. 5(b) is a cross sectional side view of the seal assembly 60 comprising the sleeve 62 and the fins 4. The seal assembly 60 of FIG. 5(b) is made of the sleeve 62 and the fins 4 are formed by cutting the sleeve 62 surface or the fins 4 are buried fixedly therein, like in the prior art case. The seal assembly 60 is fitted around the rotor 1 of FIG. 5(a) so as to form the seal device shown in FIG. 4(a).

Fitting of the seal assembly 60 onto the rotor 1 may be achieved by a press fit or a shrinkage fit in which the sleeve 62 is heated or in which the rotor 1 is cooled reversely, and the rotation prevention key 64 is applied for preventing the seal assembly 60 from rotating relative to the rotor.

With the illustrated arrangement, the seal device shown in FIG. 4(a) is formed, thereby when the fins 4 have worn out, the sleeve 62 can be removed from the rotor 1 to be changed with a separate new seal assembly without the need to also change the rotor, which is very advantageous from an economic point of view.

Further, while the manufacture of the seal device in the prior art has been achieved by the fins being cut from the rotor surface or being buried one by one in the rotor surface and a lot of work and time has been needed therefor, in the present embodiments, the sleeve 62 and the fins 4 thereon are worked separately from the rotor 1, thereby the efficiency of work and assembly can be enhanced.

As described above, according to the embodiments of the present invention, the end rotor seal shown in FIG. 1 provides an enhanced sealing performance and the fins 4, when worn out, can be changed without the need to also change the rotor 1, thus the life of the rotor 1 can be elongated, the manufacture of the seal assembly 60 is facilitated and the time required to assemble the seal device can be shortened.

The present invention provides a high differential pressure type end rotor seal, applicable as a seal for a rotor end portion of a turbine, made in a double strip seal type having fins spaced with a predetermined fin-to-fin pitch in a rotor axial direction on a rotor side and a stator side, respectively. The fins on the rotor side and those on the stator side are disposed so as to oppose each other with a predetermined clearance in a rotor radial direction maintained between apexes of the respective fins. The invention is characterized in that the fin-to-fin pitch is set in a range of 2 to 6 mm and the clearance is set in a range of 0.3 to 1.0 mm, hence even when the seal is applied as a rotational seal of a high differential pressure rotor end portion in a steam cooled type turbine, a stable sealing with a minimum leakage of steam can be achieved without being affected by the thermal elongation.

Also, the present invention provides a high differential pressure type end rotor seal as mentioned above, characterized in that the fins on the rotor side are provided on a sleeve and the sleeve is detachably fitted around the rotor end portion, and by employing such a seal construction, the following effects can be obtained;

(1) When the fins have worn out, the sleeve can be removed to be changed with a new finned sleeve. In the prior art, the rotor and the fins have been integrally formed and if the fins wear out, the rotor must also be changed. In the present invention, however, there is no need to change the rotor together with the fins, and thus, elongation of the rotor life can be achieved.

(2) The sleeve and the fins are made and assembled separately from the rotor and work time in all aspects of making, assembling, maintenance, etc. can be shortened and economical advantage can be enhanced.

What is claimed is:

1. A high differential pressure type rotor end seal for sealing a rotor end portion of a turbine, said seal defining a double strip seal type having a plurality of fins spaced with a predetermined fin-to-fin pitch in a rotor axial direction on a rotor side, and a plurality of fins spaced with a predetermined fin-to-fin pitch in a rotor axial direction on a stator side, wherein said fins on the rotor side are positioned so as to oppose said fins on the stator side with a predetermined clearance in a rotor radial direction being maintained between opposing apexes of said opposing fins, wherein said fin-to-fin pitch is set in a range of 2 to 6 mm and said clearance is set in a range of 0.3 to 1.0 mm, and wherein a ratio of said fin-to-fin pitch to said clearance is approximately 6.

2. A high differential pressure type rotor end seal as claimed in claim 1, wherein said fins on the rotor side are provided on a sleeve, and said sleeve is detachably fitted around the rotor end portion.

3. A high differential pressure type rotor end seal as claimed in claim 2, wherein said sleeve is fitted around the rotor end portion via a rotation prevention key.

4. A high differential pressure rotor end seal assembly for sealing an end portion of a turbine rotor, said seal assembly comprising:

a plurality of fins provided on the turbine rotor, said fins being spaced with a predetermined fin-to-fin pitch in an axial direction of the rotor; and a plurality of fins provided on a stator side of the turbine, said fins being spaced with a predetermined fin-to-fin pitch in the axial direction of the rotor, wherein said fins on the rotor are positioned so as to oppose said fins on the stator side of the turbine so that a predetermined clearance in a radial direction is maintained between apexes of said opposing fins, wherein said fin-to-fin pitch is greater than or equal to 2 mm and less than or equal to 6 mm, and said clearance is greater than or equal to 0.3 mm and less than or equal to 1.0 mm, and wherein a ratio of said fin-to-fin pitch to said clearance is approximately 6.

5. A high differential pressure rotor end seal assembly as claimed in claim 4, further comprising a sleeve detachably fitted on the end portion of the rotor, wherein said fins on the rotor are provided on said sleeve.

6. A high differential pressure rotor end seal assembly as claimed in claim 5, wherein said sleeve is fitted on the rotor end portion via a rotation prevention key.

* * * * *